Patented June 13, 1933

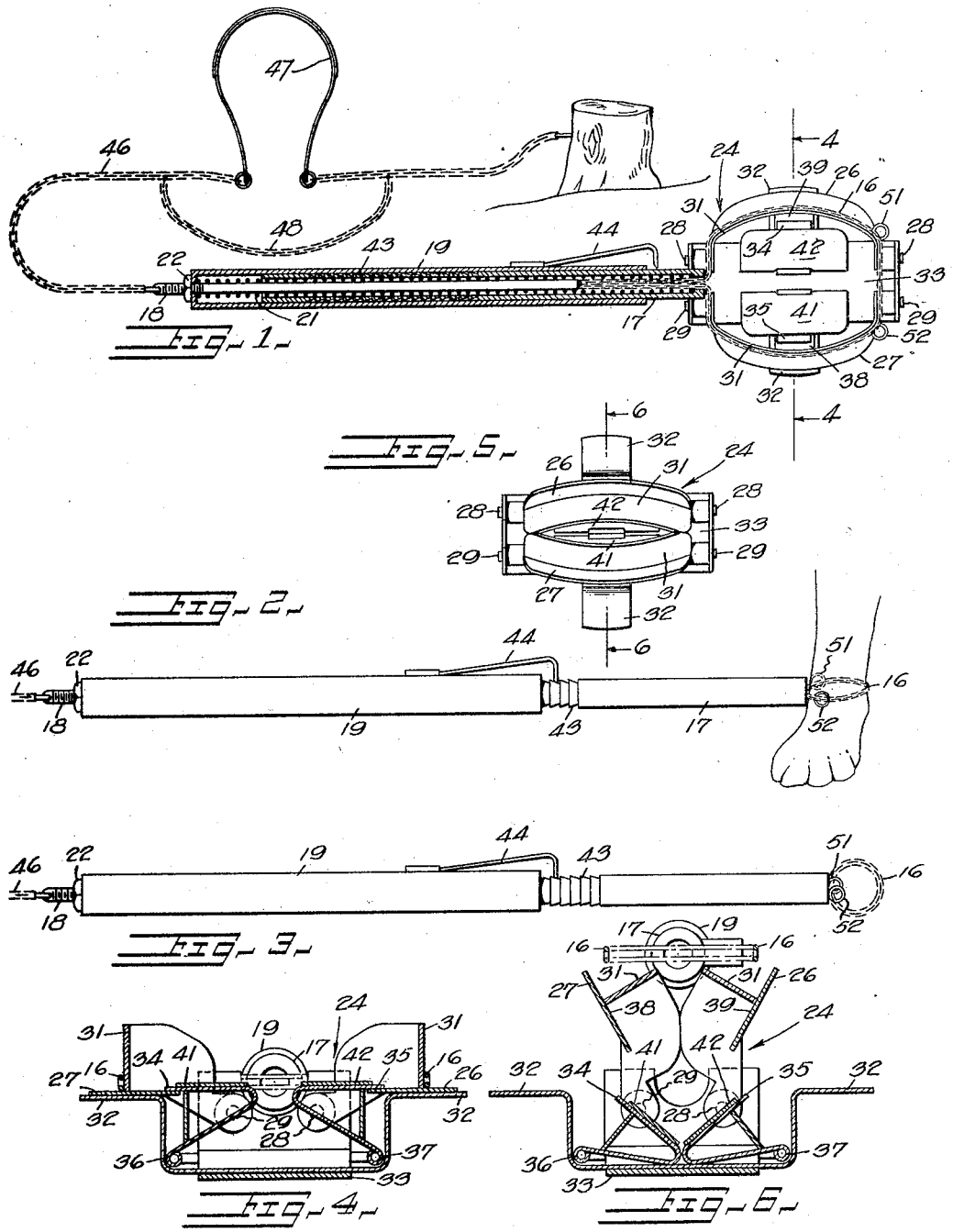

1,913,893

UNITED STATES PATENT OFFICE

JAMES P. MORRILL, OF VERDI, NEVADA, ASSIGNOR OF ONE-HALF TO ROBERT L. DOUGLASS, OF FALLON, NEVADA

ANIMAL TRAP

Application filed August 8, 1930, Serial No. 473,868. Renewed May 1, 1933.

This invention relates generally to animal traps and particularly to traps of the type utilizing a contracting noose.

One object of the invention is to provide a trap which is humane and practically painless.

Another object is to provide novel setting means in a trap employing a contracting noose.

Still another object is to provide novel means for contracting the noose of a trap of this character.

A further object is to provide novel means for adjusting the noose of a trap of this character so that animals smaller than a desired size will not be caught.

A still further object is to provide novel means for locking the noose of this type of trap in its contracted condition.

Other objects and advantages will become apparent to those skilled in the art as the detailed description of one embodiment of my invention proceeds.

Attention is directed to the accompanying drawing in which:

Fig. 1 is a plan view partly in section showing a trap embodying the principles of this invention.

Fig. 2 illustrates the position which the noose assumes around an animal's leg when the trap is sprung.

Fig. 3 is a similar to Fig. 2 and shows the position of the noose when it is contracted to its limiting position.

Fig. 4 is a cross-section taken on line 4—4 of Fig. 1 and shows the details of the noose setting mechanism.

Fig. 5 is a plan view of the noose setting mechanism in the position it assumes when the trap is sprung.

Fig. 6 is a cross-section taken on line 6—6 of Fig. 5.

It has been a common practice in the construction of animal traps to employ a noose formed of a flexible element, such as a wire or a cord which is adapted to engage some portion of an animal's body when the trap is sprung. Usually the contraction of the noose has been effected by a pull exerted on the cord in an upward direction so that the entrapped animal is lifted clear of the ground and is suspended by the neck or leg. When a noose is employed which engages the animal's neck, the animal chokes to death and this type of trap therefore is unsuitable for catching animals alive. On the other hand, when a noose of this type is employed which engages the animal's leg the suspended animal is subjected to slow torture. By the exercise of this invention such cruelty is avoided although the escape of the animal is effectively prevented.

Referring to the drawing a noose 16 is shown, formed preferably by a cord, chain, cable or the like, the ends of which extend within a hollow tube 17 where they are secured to one end of a rod 18. Tube 17 fits loosely and telescopes within a tube 19 and a spring 21 is provided, one end of which abuts against tube 19 and the other end of which engages tube 17 to normally urge these tubes apart. Rod 18 extends through one end of tube 19 and retaining means, such as a nut 22 on the end of rod 18 prevents relative movement between the rod and the tube. By this construction any longitudinal movement between tubes 17 and 19 causes the opening in noose 16 to vary in size. Thus, when tube 17 is pushed into tube 19 noose 16 becomes larger and when tube 17 is forced out of tube 19, noose 16 becomes smaller.

For holding the noose in expanded condition a setting mechanism or set, indicated generally at 24, is employed. Set 24 comprises a pair of chain-retaining members 26 and 27 mounted for pivotal movement about pivots 28 and 29 respectively. Noose retaining members 26 and 27 are preferably semi-circular or semi-elliptical in shape and cord 16 assumes the shape of these members when it is placed against the upstanding portions 31 of these members. Shelf-like extensions 32 mounted on base 33 of the set form a support for noose-retaining members 26 and 27 when the set is in its operative condition.

A pair of trigger members 34 and 35 hinged at 36 and 37 respectively, are adapted to engage projections 38 and 39 extending inwardly from noose-retaining members 26 and 27. Trigger members 34 and 35 are adapted to be tripped by the foot of the animal as he steps within the area surrounded by noose 16 and for this purpose each trigger member 34 and 35 is provided with a platform or foot-engaging member 41 and 42. In Fig. 4 the relative positions of the cooperating elements of the setting mechanism are shown when the trap is in its set condition, and Fig. 6 shows substantially the positions which these elements assume at the moment the trap is sprung.

From an inspection of Fig. 6 it will be noticed that noose 16 is carried upwardly by the swinging action of members 26 and 27 when the trap is sprung. This movement of noose 16 serves to carry the noose further up on the leg of the animal and in this manner holds him more securely. Preferably the swinging movement of members 26 and 27 is effected solely by the force exerted on these members by noose 16 which normally tends to assume its contracted condition under the force of spring 21. When either one or both trigger members 34 and 35 are tripped, the restraint against movement of the members 26 and 27 is removed and the contracting force in noose 16 swings members 26 and 27 upwardly, as shown in Fig. 6. This upward rotation of members 26 and 27 carries noose 16 to a position in which it engages the animal's leg substantially as shown in Fig. 2.

When tube 17 is forced outwardly to effect contraction of noose 16 a toothed or ratcheted portion 43 on tube 17 becomes engaged by a retaining pawl 44. The teeth on toothed portion 43 of tube 17 are faced in such a direction that further contraction of noose 16 is permitted but expansion of the noose is prevented. In this manner the noose is positively locked in its contracted condition and no amount of pulling and tugging at noose 16 by the animal will cause the noose to expand. However, the animal may be readily released by the trapper merely by disengaging pawl 44 from teeth 43 and pushing tube 17 inwardly into tube 19, thereby expanding the noose.

From the foregoing it will be apparent that there is no member to cut or bruise or in any other manner injure the animal. Noose 16, however, positively prevents escape of the animal, but this is done without any special pain or punishment.

A chain or cord 46 is secured to the trap and is adapted to be securely anchored to any suitable object. In accordance with my invention, I provide a spring 47 to connect two points in chain 46 in a manner to form a loop 48. The spring 47 preferably comprises a band spring formed to a U-shape which serves as a shock absorber, that is, it gives the animal a resilient member to pull against so that no injury to the leg of the animal will result from its continued pulling in attempting to free itself. It is to be noted that a spring of this character possesses several advantages over a coil spring or other type of spring, among them being that a U-shaped band spring will not become clogged with dirt, twigs, and other foreign matter, while a coil spring easily becomes clogged by such material with a result that it is rendered less effective as a shock absorber. Another advantage of the U-shaped band spring is that the pull exerted by the trapped animal is substantially entirely taken up by one arm of the spring and not transmitted to the other arm to any appreciable extent, so that there is only a relatively light pull upon the anchor side of the chain. Further, because of this last mentioned action of the U-shaped spring, there is no recoil and vibration of the spring upon the periodic pulling of the animal, as would be present should a coil spring be employed, and consequently, a U-shaped spring will have a longer life than a coil spring. If the animal pulls harder than a predetermined amount, however, loop 48 becomes taut against the inelastic chain or cord 46. Preferably the size of loop 48 is so chosen that there is no danger of stretching spring 47 beyond its elastic limit, but should the spring 47 break by accident, or other cause, there would still be an integral chain to prevent the animal's escape.

Frequently the trapper is interested in only a particular animal or in a number of animals of a particular size. In such instances he has no use for, and does not desire to torment smaller animals. In order to enable smaller animals to go free when they trip the trap, a pair of enlargements, conveniently in the form of rings 51 and 52 are fixed at proper points in noose 16. Rings or enlargements 51 and 52 are preferably of such size that they are too large to enter the opening in tube 17. Tube 17 therefore as it slides along the cord to contract noose 16 is abruptly stopped when it reaches rings 51 and 52 and the noose is not contracted further. The position which noose 16 assumes under these conditions is shown in Fig. 3. When an animal having a leg smaller than this noose springs the trap, he is permitted to escape.

A trap constructed in accordance with this invention is faster than other types of traps employing a noose for the reason that there is relative movement between both ends of the noose-forming cord and the contracting means. When one end only of the cord is actuated, it is apparent that the noose is contracted at a rate which is only one half as great as when both ends are actuated, provided other conditions remain the same. Furthermore, the actuating spring 21 can have sufficient power to operate the parts with great rapidity. These considerations, when taken together with the fact that the noose is carried higher on the animal's leg when the trap is sprung indicates that the animal has very little chance of avoiding the trap once the trigger members are actuated.

While I have shown and described a preferred embodiment of my invention, I do not wish to be limited thereto, since the invention as defined in the appended claims can be embodied in a plurality of forms.

I claim:

1. In an animal trap, a pair of telescoping tubes, a spring for urging said tubes apart, a noose secured to one of said tubes and passing through an open end of the other of said tubes, and means for releasing the tubes to permit extension thereof under the force of said spring, thereby effecting contraction of the noose.

2. In an animal trap, a noose, resilient actuating means constantly urging contraction of said noose, setting means for holding said noose in expanded condition against the force of said actuating means, said actuating means serving to hold said noose taut against the setting means about the entire extent of the noose, and trippable means in said setting means for effecting release of said noose.

3. In an animal trap, a pair of telescoping tubes, a spring for urging said tubes apart, a noose secured to one of said tubes and passing through an open end of the other of said tubes, setting means for holding the noose in expanded condition and against which the noose is held taut, said setting means serving to prevent expansion of said tubes under the force of the spring, and trippable means in said setting means for effecting release of the tubes to contract the noose.

4. In an animal trap, a noose, resilient actuating means constantly urging contraction of said noose, setting means for holding said noose taut throughout its entire extent, the pressure exerted on the noose by the actuating means against said setting means serving to maintain the same in set condition, and trippable means for effecting release of said setting means.

5. In an animal trap, a noose, resilient actuating means constantly urging contraction of said noose, setting means for holding said noose in expanded condition against the force of said actuating means, said actuating means serving to hold said noose taut against the setting means about the entire extent of the noose, trippable means in said setting means for effecting release of said noose, and means for forcing the noose in a direction away from said setting means at the instant the noose begins to contract.

6. In an animal trap, a pair of telescoping tubes, a spring for urging said tubes apart, a noose secured to one of said tubes and passing through an open end of the other of said tubes, setting means for holding the noose in expanded condition and against which the noose is held taut, said setting means serving to prevent expansion of said tubes under the force of the spring, trippable means in said setting means for effecting release of the tubes to contract the noose, and means for forcing the noose in a direction away from said setting means at the instant the noose begins to contract.

7. In an animal trap, a noose, resilient actuating means for constantly urging contraction of said noose, setting means for holding said noose taut throughout its entire extent, the pressure exerted upon the noose by the actuating means against said setting means serving to maintain the same in set condition, trippable means for effecting release of the said setting means, and means for forcing the noose in a direction away from said setting means at the instant the noose beings to contract.

8. In an animal trap, a pair of telescoping tubes, a spring for urging said tubes apart, a noose secured to one of said tubes and passing through an open end of the other of said tubes, means for releasing the tubes to permit extension thereof under the force of said spring, thereby effecting contraction of the noose, and means secured to said noose for limiting the amount of contraction of said noose.

9. In an animal trap, a pair of telescoping tubes, a spring for urging said tubes apart, a noose secured to one of said tubes and passing through an open end of the other of said tubes, means for releasing the tubes to permit extension thereof under the force of said spring, thereby effecting contraction of the noose, and means for locking said noose in contracted condition.

10. An animal trap comprising a noose, spring pressed means engaging the noose to constantly urge contraction of the noose, stop means carried by the noose at points spaced apart to limit contraction of the noose, a pair of pivoted noose engaging jaws for holding the noose open against the tension of said spring pressed means, and trip means engaging said jaws to releasably hold the jaws open.

11. An animal trap comprising a noose, spring pressed means engaging the noose to constantly urge contraction of the noose, and trippable noose holding means for holding the noose open against the tension of the spring means, said noose holding means comprising a base member, a pair of flanged jaws, means for pivotally mounting the jaws on the base, and trip means carried by the base for releasably holding the jaws open.

In testimony whereof, I have hereunto set my hand.

JAMES P. MORRILL.